A. F. JENKINS.
PROCESS OF WELDING METALS.
APPLICATION FILED MAR. 5, 1921. RENEWED FEB. 18, 1922.
1,412,656.
Patented Apr. 11, 1922.
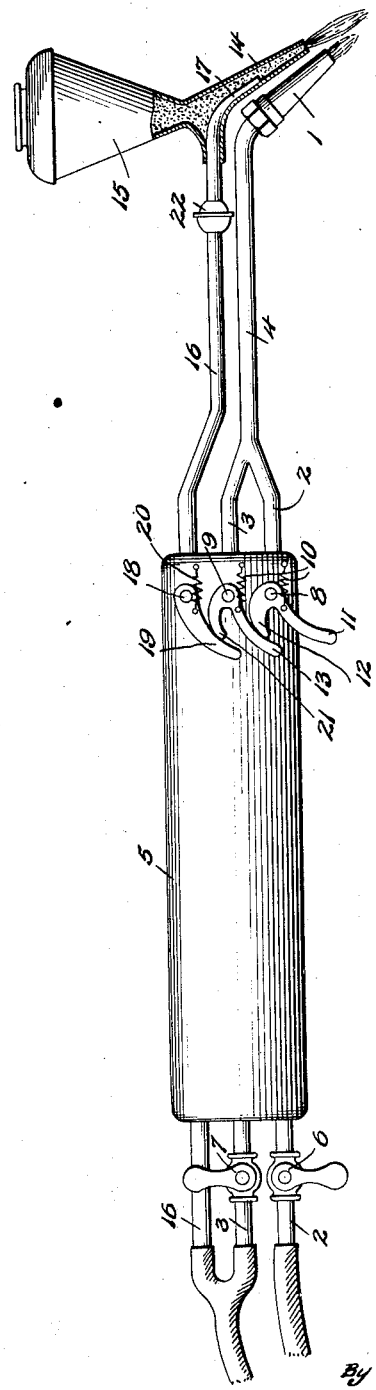

UNITED STATES PATENT OFFICE.

ALEXANDER F. JENKINS, OF BALTIMORE, MARYLAND.

PROCESS OF WELDING METALS.

1,412,656. Specification of Letters Patent. Patented Apr. 11, 1922.

Original application filed May 8, 1918, Serial No. 233,306. Divided and this application filed March 5, 1921, Serial No. 449,784. Renewed February 18, 1922. Serial No. 537,647.

*To all whom it may concern:*

Be it known that I, ALEXANDER F. JENKINS, a citizen of the United States, and residing at Baltimore city, State of Maryland, have invented certain new and useful Improvements in Processes of Welding Metals, of which the following is a specification.

This invention relates to methods of welding metals and particularly to methods of coating wherein small metallic particles are fed to a joint to be welded or on to a surface on which a metal coating is to be formed, the particles and the work being heated, so that they weld themselves together and to the work.

The object of the invention is to provide a novel method of applying the heating flame and the metal particles to the work whereby the weld is made quickly and efficiently and without losing or scattering the metal particles which are being supplied in the welding operation.

The method consists in preferably preheating the metal to be welded or filled, using the torch flame, and when the metal is sufficiently heated, the granulated metal is forcibly fed to the work by a stream of oxygen or other fluid, or by any other suitable agency, with the result that the particles immediately adhere to the heated surface, and under the influence of additional heat from the torch flame there is a quick amalgamation of the particles with the metal being welded or filled. Practice shows that metal added in this manner amalgamates more thoroughly than when the solid rod is used, and furthermore that the metal does not have to be "puddled" in the way necessary with a solid rod to cause amalgamation.

It is preferable, at the time of feeding the metal particles, to cut down the gas flow to the flame to a point sufficient to keep the flame from extinguishing, as otherwise the high pressure of the flame would blow the particles away from the work. As soon as the particles adhere, the flame is restored and played on the work and metal particles to complete the amalgamation.

For a more complete understanding of the invention reference is to be had to the following description and claims taken in connection with the accompanying drawings which illustrates one embodiment of which the invention is capable. The torch apparatus illustrated is claimed in my copending application, Serial No. 233,306, filed May 8, 1918, of which this is a division.

The figure is a side view of a torch equipped with the automatic metal particle feeding device.

Referring to the drawing, 1 designates the flame tip or nozzle of the torch or blow pipe to which acetylene gas and oxygen are supplied through tubes 2 and 3, although other combustible fluids may be employed. The gas and oxygen mix in the tube 4 to which the nozzle is attached. The torch has a handle 5 through which the gas and oxygen conduits extend, and at the rear end of the handle are mixture regulating valves 6 and 7 in the tubes 2 and 3. At the front end of the handle the tubes have trigger valves 8 and 9, each normally held open by a spring 10. The trigger 11 of valve 8 has a cam 12 which engages the trigger 13 of valve 9 so as to close the latter as the operator closes the valve 8, for the purpose of regulating the flame.

Associated with the top 1 is a metal particle spraying nozzle 14 which is connected with a reservoir or equivalent means 15 that holds metal particles, and into the nozzle leads a pipe 16 which terminates in an ejector nozzle 17. The pipe is connected with the oxygen conduit at a point on the inlet side of the regulating valve 7, so that the full pressure of the oxygen will always be available for the spraying device. In the pipe 16 is a controlling valve 18 provided with a trigger 19 that is under the tension of the valve-closing spring 20 and that is adapted to be engaged by the cam 21 on the trigger 13, so that when the valves 8 and 9 are closed the spraying valve 18 will be open.

If desired, in certain instances the spraying of metal can take place when the welding flame is operating, this being done by holding the valve 18 open while the valves 8 and 9 are open. But it is preferable to spray the metal particles while the flame is not operating at full force (as shown in the drawing), as otherwise the particles might be blown away. The flame is cut down by operating the trigger 11 just low enough to prevent extinguishing, and this takes place simultaneously with the opening of the metal feed. In the figure the valves 8 and 9 are closed and the valve 18 opened.

In use, the flame is used to preheat the work, and when the latter is sufficiently heated, the flame is manually reduced and the metal particle feed simultaneously opened. The particles will now adhere to the work, and when a sufficient amount of particles are sprayed the feed is stopped and the flame restored to complete the weld by additional heat. The universal joint 22 permits of adjustment of the metal discharging nozzle whenever required.

From the foregoing description the advantages of the method will be readily understood by those skilled in the art to which the invention appertains, and while I have described the principle of operation, together with the device which I now consider to be the best embodiment thereof, I desire to have it understood that the method may be carried out by apparatus having widely different construction, not being limited to one particular apparatus.

Having thus described the invention what I claim as new and desire to secure by Letters Patent is:

1. The hereindescribed method of welding or uniting metals, which consists in heating the work to a suitable degree, feeding metal particles to the work while the heating flame is cut off to cause the particles to amalgamate therewith, and then again heating the work to effect a thorough amalgamation of the particles therewith.

2. The hereindescribed method of welding or uniting metals, which consists in directing a flame on the work to heat the same, temporarily removing the flame, supplying metal particles to the work while the latter is hot to cause the metal particles to adhere, and finally restoring the flame to the work to cause the metal particles to amalgamate therewith.

In testimony whereof I hereunto affix my signature.

ALEXANDER F. JENKINS.